United States Patent
Schmitt et al.

(10) Patent No.: US 12,545,298 B2
(45) Date of Patent: Feb. 10, 2026

(54) METHOD FOR ENRICHING A MAP REPRESENTATION OF A TRAFFIC INFRASTRUCTURE

(71) Applicant: Robert Bosch GmbH, Stuttgart (DE)

(72) Inventors: Andreas Schmitt, Cologne (DE); Jesus Rodriguez, Yokohama (JP); Kazuya Tamura, Kanagawa (JP); Ming Gao, Harsum (DE); Oliver Roeth, Elze (DE); Keisuke Namura, Kanagawa (JP)

(73) Assignee: ROBERT BOSCH GMBH, Stuttgart (DE)

( * ) Notice: Subject to any disclaimer, the term of this patent is extended or adjusted under 35 U.S.C. 154(b) by 271 days.

(21) Appl. No.: 18/182,890

(22) Filed: Mar. 13, 2023

(65) Prior Publication Data

US 2023/0311948 A1  Oct. 5, 2023

(30) Foreign Application Priority Data

Apr. 1, 2022 (DE) ............. 10 2022 203 253.5

(51) Int. Cl.
*B60W 60/00* (2020.01)
*B60W 50/00* (2006.01)
*G08G 1/01* (2006.01)

(52) U.S. Cl.
CPC ....... *B60W 60/0027* (2020.02); *G08G 1/0137* (2013.01); *B60W 50/0097* (2013.01); *B60W 2554/408* (2020.02); *B60W 2556/50* (2020.02)

(58) Field of Classification Search
CPC ......... B60W 60/0027; B60W 50/0097; B60W 2554/408; B60W 2556/50;
(Continued)

(56) References Cited

U.S. PATENT DOCUMENTS

| | | | |
|---|---|---|---|
| 2010/0034483 A1* | 2/2010 | Giuffrida | G06T 7/12 382/284 |
| 2010/0241354 A1* | 9/2010 | Stahlin | B60W 40/02 701/532 |

(Continued)

FOREIGN PATENT DOCUMENTS

DE 102016007567 A1 12/2017
DE 102020202476 A1 8/2021

*Primary Examiner* — Donald J Wallace
*Assistant Examiner* — Jalal C Coduroglu
(74) *Attorney, Agent, or Firm* — NORTON ROSE FULBRIGHT US LLP

(57) ABSTRACT

A method for enriching a map representation of a traffic infrastructure. The method includes: receiving map data of a map representation of a traffic infrastructure, the map representation including pieces of information of a multitude of roadways negotiable by vehicles, the map representation encompassing pieces of information regarding at least one roadway including a transition area; receiving trajectory data of a multitude of first driving trajectories and a multitude of second driving trajectories of a multitude of vehicles; ascertaining a first number of the first driving trajectories and a second number of the second driving trajectories, and comparing the first number to the second number; and marking the first route as a preferred route in the map representation if the first number is greater than the second number.

10 Claims, 3 Drawing Sheets

(58) Field of Classification Search
CPC ..... B60W 30/18154; B60W 2050/146; B60W 50/14; B60W 2552/10; B60W 2556/10; B60W 2556/40; B60W 50/00; G08G 1/0137; G08G 1/0129; G08G 1/0141; G08G 1/096725; G08G 1/096775; G08G 1/096838; G08G 1/0112; G01C 21/3492; G01C 21/3815; G01C 21/3841; G01C 21/367; G01C 21/3691; G01C 21/3446; B60K 2360/166; G06F 16/29

See application file for complete search history.

(56) References Cited

U.S. PATENT DOCUMENTS

| | | | | |
|---|---|---|---|---|
| 2010/0312466 | A1* | 12/2010 | Katzer | G08G 1/096827 |
| | | | | 701/533 |
| 2011/0160986 | A1* | 6/2011 | Wu | G08G 1/0962 |
| | | | | 701/117 |
| 2014/0032108 | A1* | 1/2014 | Zeng | B60W 30/12 |
| | | | | 382/104 |
| 2017/0137025 | A1* | 5/2017 | Muto | G08G 1/0133 |
| 2019/0179324 | A1* | 6/2019 | Rottkamp | G08G 1/09675 |
| 2020/0255027 | A1* | 8/2020 | Kulkarni | G01C 21/3602 |
| 2020/0294401 | A1* | 9/2020 | Kerecsen | G08G 1/205 |
| 2020/0386569 | A1* | 12/2020 | Stajner | G08G 1/096844 |
| 2021/0094581 | A1* | 4/2021 | Lee | B60W 30/14 |
| 2021/0341927 | A1* | 11/2021 | Refaat | G05D 1/0221 |
| 2022/0180645 | A1* | 6/2022 | Adachi | G06V 10/74 |
| 2025/0014462 | A1* | 1/2025 | Ghods | G08G 1/0141 |

\* cited by examiner

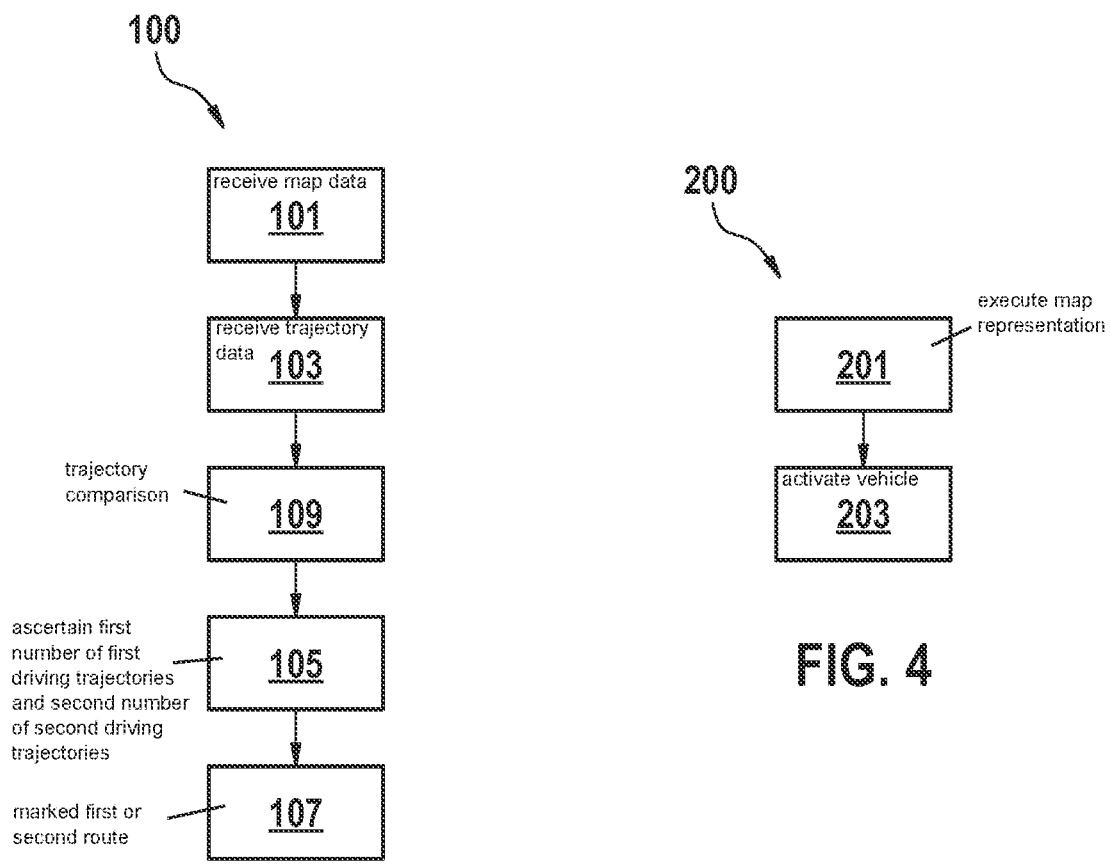
FIG. 3
FIG. 4
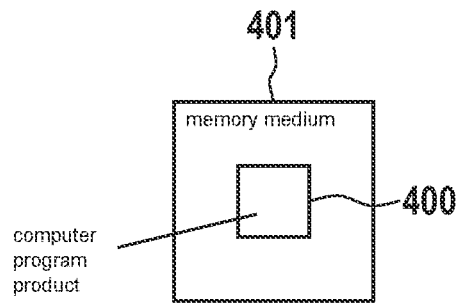
FIG. 5

METHOD FOR ENRICHING A MAP REPRESENTATION OF A TRAFFIC INFRASTRUCTURE

CROSS REFERENCE

The present application claims the benefit under 35 U.S.C. § 119 of German Patent Application No. DE 10 2022 203 253.5 filed on Apr. 1, 2022, which is expressly incorporated herein by reference in its entirety.

FIELD

The present invention relates to a method for enriching a map representation of a traffic infrastructure. The present invention furthermore relates to a method for controlling a vehicle, taking an accordingly enriched map representation into consideration.

BACKGROUND INFORMATION

Precise map representations of the traffic infrastructure are essential for the control of vehicles, in particular for the autonomous control of vehicles. In the process, the quality of a map representation, in addition to a precision of the depiction of reality, includes the consideration of additional information, in particular with respect to the course of the represented roadways. A piece of additional information which goes beyond the course of the roadway and, for example, encompasses a customary behavior of road users at certain locations of the roadways makes it possible to enhance the safety and precision of the control of the vehicles.

SUMMARY

It is an object of the present invention to provide an improved method for enriching a map representation of a traffic infrastructure and an improved method for controlling a vehicle. This object may be achieved by the method for enriching a map representation of a traffic infrastructure and by the method for controlling a vehicle according to the present invention. Advantageous embodiments of the present invention are disclosed herein.

According to one aspect of the present invention, a method for enriching a map representation of a traffic infrastructure is provided. According to an example embodiment of the present invention, the method includes:
  receiving map data of a map representation of a traffic infrastructure, the map representation including pieces of information of a multitude of roadways negotiable by vehicles, the map representation encompassing pieces of information with respect to at least one roadway including a transition area, a split of the at least one roadway into at least one first further roadway and a second further roadway or a fusion of at least the first further roadway and the second further roadway into the at least one roadway taking place in the transition area;
  receiving trajectory data of a multitude of first trajectories and a multitude of second trajectories of a multitude of vehicles, the first trajectories extending along a first route encompassing the at least one roadway and the first further roadway, and the second trajectories extending along a second route encompassing the at least one roadway and the second further roadway;
  ascertaining a first number of the first trajectories and a second number of the second trajectories, and comparing the first number to the second number; and
  marking the first route as a preferred route in the map representation if the first number is greater than the second number.

In this way, a technical advantage may be achieved in that an improved method for enriching a map representation of a traffic infrastructure may be provided. The method according to the present invention provides pieces of information regarding a preferred route along the roadway and through the transition area along the further roadways to the map representation for roadways including a transition area, in which the roadway is split into further roadways or in which a fusion of further roadways into the particular roadway takes place. In the process, the information regarding the preferred route is calculated based on trajectory data of a multitude of driving trajectories of a multitude of vehicles along the roadway and the further roadways through the transition area. For this purpose, the number of first driving trajectories which extend along the roadway and a first further roadway and the number of second driving trajectories which extend along the roadway and a second further roadway are calculated. The numbers of the first and second driving trajectories are compared to one another, and a preferred route is defined for the driving trajectories having the larger number. Corresponding information of the preferred route is thereupon noted in the map representation. By counting the various driving trajectories along the different routes, a technically simple method for determining a preferred route is made possible. By taking the information of the preferred route into consideration within the map representation, the map representation may provide additional pieces of information for a later control of a vehicle. The information regarding the preferred route may, for example, be taken into consideration in the route planning of the vehicle so that a vehicle may be guided along the preferred route. As an alternative, the information of the preferred route may be taken into consideration during the behavior prediction of further vehicles in that the vehicle to be guided, having knowledge of the preferred route through the transition area, may assume that a majority of the further road users will drive along the preferred route. This enables a more precise behavior prediction and, associated therewith, a safer control of the vehicle.

According to one specific embodiment of the present invention, the first number is greater than the second number if a difference between the first number and the second number is greater than a predetermined limiting value, no marking of the preferred route taking place if the difference is smaller than the predetermined limiting value.

In this way, a technical advantage may be achieved that a minimum difference for the presence of a preferred route may be established via the predetermined limiting value for the difference between the first and second numbers of the first and second driving trajectories along the first and second routes. In this way, it is possible to prevent that, when only a very small difference between the two numbers exists, for example only one driving trajectory, one of the two routes is classified as the preferred route. Upon a shortfall of the predetermined limiting value for the difference between the two numbers, in contrast, the two routes are assessed as being equivalent, and no preferred route is noted in the map representation. This improves the precision and accuracy of the assessment of the routes as a preferred route. This increases the precision of the control, taking the accordingly enriched map representation into consideration, in that a more precise behavior prediction of the further road users, based on the information regarding the preferred routes, is made possible.

According to an example embodiment of the present invention, the information of the preferred route may encompass a percentage. In the process, the percentage may, for example, encompass a ratio of the first and second numbers of the first and second driving trajectories. As a result of the percentage of the preferred route, which states, for example, that the preferred route is traveled by 75% of the vehicles, a more precise control of the vehicle is made possible, in particular with respect to a behavior prediction of the preceding road users. Based on the information regarding the preferred route, the vehicle to be controlled may accordingly assume that the preceding further road users will select the preferred route according to the stated percentage.

According to one specific embodiment of the present invention, the trajectory data encompass time stamps, the marking of the preferred route being carried out with respect to a time of day and/or with respect to a day of the week.

In this way, a technical advantage may be achieved that a precise piece of information regarding the preferred route may be stored in the map representation. By taking the time stamps of the driving trajectories into consideration, this information may encompass a piece of information regarding the time of day and/or a piece of information regarding the day of the week. As a function of the time of day, different routes may be preferred by the road users, depending on traffic volume. The same may apply to different days of the week in that, for example, other routes are preferred on weekends than is the case on weekdays. By taking the piece of information regarding the time of day or the day of the week into consideration and by calculating the time of day or day of the week dependent preferred routes, the precision of the information regarding the preferred routes of the map representation may be further increased.

According to one specific embodiment of the present invention, the method furthermore includes:
carrying out a trajectory comparison for adapting the pieces of information of the trajectory data to the map representation.

In this way, a technical advantage may be achieved that a precise consideration of the trajectory data for determining the preferred routes within the map representation is made possible.

According to one specific embodiment of the present invention, the transition area is formed by an intersection area of at least two roadways, an on-ramp area or an exit ramp area of an expressway, a widening area of a roadway to a roadway having a larger number of traffic lanes and/or a narrowing area of a roadway to a roadway having a lower number of traffic lanes.

In this way, a technical advantage may be achieved that different transition areas, which may occur in conventional traffic infrastructures, may be taken into consideration. In this way, a precise reproduction of the reality may be achieved by the accordingly enriched map representation.

According to one specific embodiment of the present invention, the map representation encompasses pieces of information regarding a multitude of roadways including transition areas, the received trajectory data encompassing driving trajectories along the multitude of roadways including transition areas, and preferred routes being simultaneously ascertained for the multitude of roadways including transition areas.

In this way, a technical advantage may be achieved that a rapid enrichment of the map representation with pieces of information regarding preferred routes on various roadways including transition areas is made possible.

According to one specific embodiment of the present invention, the trajectory data are based on fleet data of a multitude of trips of a fleet of vehicles.

In this way, a technical advantage may be achieved that, due to a high number of different trajectory data, a high precision is made possible during the determination of the preferred routes.

The higher the number of available driving trajectories, the more meaningful a general conclusion may be drawn about the preferred route. By taking the fleet data of the vehicle fleets into consideration, it is furthermore possible to achieve continual updating of the map representation.

According to one specific embodiment of the present invention, the map representation is designed as a topological map of the traffic infrastructure.

In this way, a technical advantage may be achieved that a meaningful map representation may be provided.

According to one further aspect of the present invention, a method for controlling a vehicle is provided. According to an example embodiment of the present invention, the method includes:
executing a map representation of a traffic infrastructure which is enriched according to the method for enriching a map representation of a traffic infrastructure according to one of the preceding specific embodiments; and
controlling the vehicle, taking a piece of information marked in the map representation as a preferred route into consideration.

In this way, a technical advantage may be achieved that an improved method for controlling a vehicle may be provided, in which the vehicle may be guided according to the routes marked as being preferred. The control of the vehicle may encompass in the process that the vehicle is guided along the preferred route. As an alternative or in addition, the information regarding the preferred route may be used for predicting the behavior of further road users in the transition area. Based on the information of the map representation, it may then be assumed that further vehicles will drive along the preferred route with certain likelihood, and a control of the vehicle may be adapted thereto.

According to a further aspect of the present invention, a processing unit is provided, which is configured to carry out the method for enriching a map representation of a traffic infrastructure according to one of the above specific embodiments and/or the method for controlling a vehicle.

According to a further aspect of the present invention, a computer program product is provided, encompassing commands which, during the execution of the program by a data processing unit, prompt the data processing unit to carry out the method for enriching a map representation of a traffic infrastructure according to one of the above specific embodiments and/or the method for controlling a vehicle.

Exemplary embodiments of the present invention are described below based on the figures.

BRIEF DESCRIPTION OF THE DRAWINGS

FIG. 3 shows a flowchart of a method for enriching a map representation of a traffic infrastructure, according to an example embodiment of the present invention.

FIG. 4 shows a flowchart of a method for controlling a vehicle, according to an example embodiment of the present invention.

FIG. 5 shows a schematic representation of a computer program product.

DETAILED DESCRIPTION OF EXAMPLE EMBODIMENTS

Figure 1:
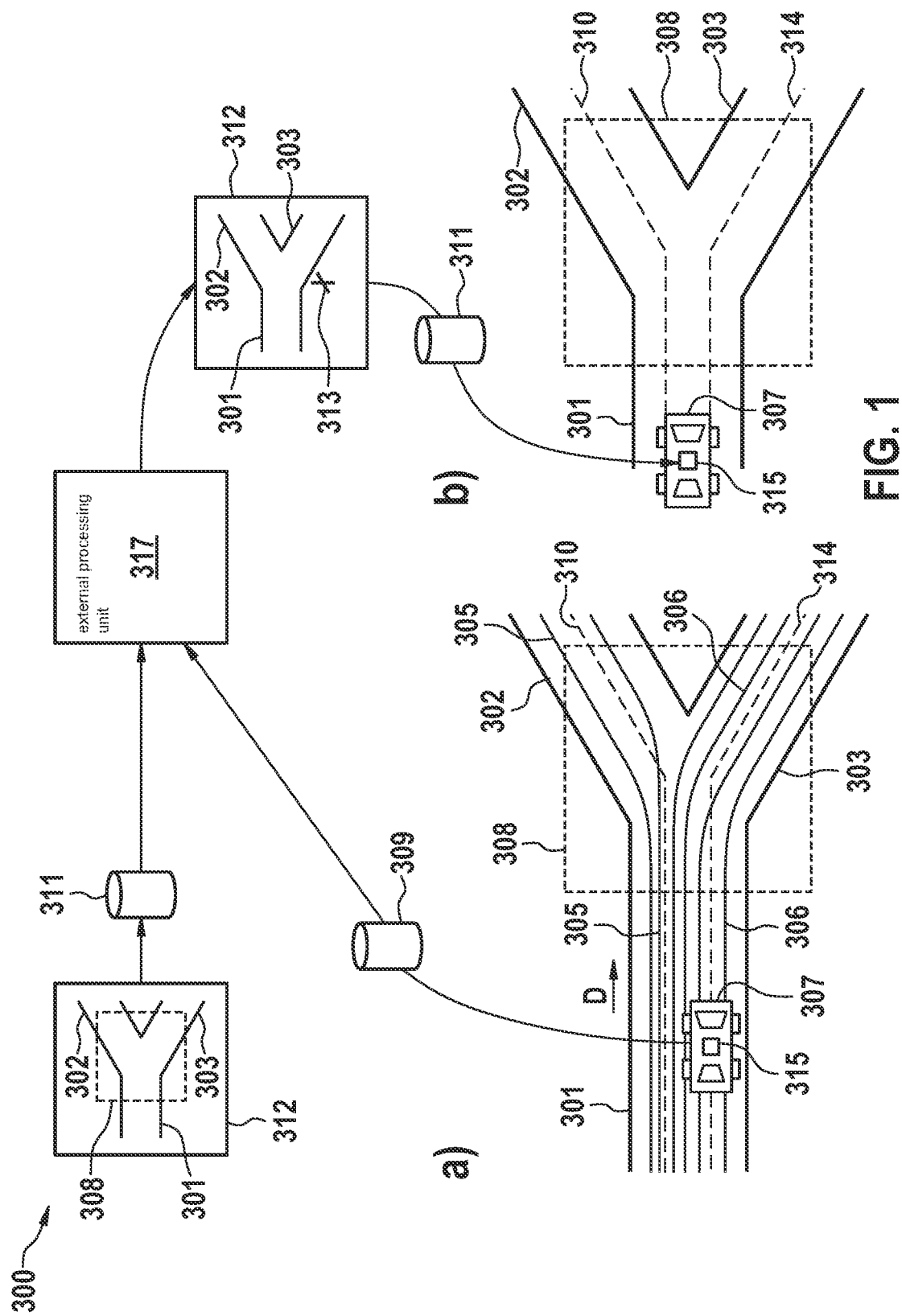
FIG. 1 shows a schematic representation of a system for enriching a map representation of a traffic infrastructure, according to an example embodiment of the present invention.

FIG. 1 shows a schematic representation of a system 300 for enriching a map representation 312 of a traffic infrastructure.

Graphic a) shows a roadway 301 including a transition area 308. In transition area 308, roadway 301 splits into a first further roadway 302 and a second further roadway 303. Graphic a) furthermore shows a multitude of first driving trajectories 305 and second driving trajectories 306. First driving trajectories 305 extend along a first route 310. First route 310 extends along roadway 301 through transition area 308 and along first further roadway 302. Second driving trajectories 306 extend along a second route 314. Second route 314 extends along roadway 301 through transition area 308 and along second further roadway 303.

Graphic a) furthermore shows a vehicle 307 including a processing unit 315. Processing unit 315 is configured to carry out the method according to the present invention for enriching a map representation and/or the method according to the present invention for controlling vehicle 307. In graphic a), vehicle 307 is driving along roadway 301 and is configured to determine trajectory data 309 of an executed driving trajectory and to transfer them to an external processing unit 317. For this purpose, the vehicle may include a data communication link, for example a wireless connection, to external processing unit 317. External processing unit 317 is configured to carry out method 100 according to the present invention for enriching a map representation 312 of a traffic infrastructure. External processing unit 317 may, for example, be designed as an external server unit, for example an external cloud server.

For carrying out method 100 according to the present invention for enriching a map representation 312 of a traffic infrastructure, processing unit 317 receives trajectory data 309 of a multitude of vehicles 307. In the process, trajectory data 309 encompass driving trajectories along a roadway 301 including a transition area 308, in which a split of roadway 301 into at least one first further roadway 302 and a second further roadway 303 takes place, as is shown in graph a), or in that a fusion of the at least one first further roadway 302 and of second further roadway 303 into the at least one roadway 301 takes place. A split or a fusion of the roadways relates to a driving direction D of vehicles 307.

Furthermore, processing unit 317 receives map data 311 of a map representation 312 of the traffic infrastructure. As shown, map representation 312 shows at least the one roadway 301 including transition area 308 and the at least two first and second further roadways 302, 303.

For ascertaining a preferred route along roadway 301 and through transition area 308, according to the present invention a first number of first driving trajectories 305 along first route 310 and a second number of second driving trajectories 306 along second route 314 are ascertained. Furthermore, a difference of the first number and the second number is ascertained, and the larger of the two numbers is determined. The route having the larger number of driving trajectories is thereupon determined as a preferred route along the at least one roadway 301 through transition area 308.

According to one specific embodiment, a predetermined limiting value for the at least to be reached difference of the two numbers of the first and second driving trajectories 305, 306 may be established for this purpose. If the predetermined limiting value is not exceeded by the difference of the two numbers of first and second driving trajectories 305, 306, the two routes 310, 314 are considered as equivalent, and no preferred route is defined.

According to one specific embodiment, driving trajectories 305, 306 encompass time stamps, according to which driving trajectories 305, 306 or the corresponding trajectory data may be assigned to certain times of day or days of the week, on which the respective vehicles 307 drove along the at least one roadway 301 while trajectory data 309 were being recorded. Taking the time stamps into consideration, it is thus possible to determine preferred routes for different times of day or days of the week. For example, for the example of graphic a), first route 310 may be preferred for times of day during rush hour, while second route 314 is preferred for weekends or night times.

According to one specific embodiment, the information regarding the preferred route may include a percentage. For this purpose, the two numbers of first and second driving trajectories 305, 306 along first and second routes 310, 314 may be placed in relation to one another, and a percentage of the driving trajectories along first route 310 and a percentage of the driving trajectories along second route 314 may be determined with respect to the total number of driving trajectories. The information regarding the preferred route may encompass, in the process, that the respective route is, for example, preferred at a rate of 75%.

In the shown graphic a), first and second driving trajectories 305, 306 have different numbers, with more second driving trajectories 306 extending along second route 314 than first driving trajectories 305 extend along first route 310. According to the method according to the present invention, second route 314 would thus be defined as the preferred route for the shown transition area 308.

Following the determination of the preferred route, according to the present invention, a corresponding piece of information 313 regarding the preferred route is noted in the map representation 312, and an accordingly enriched map representation is generated. Piece of information 313 regarding the preferred route through transition area 308 stored in map representation 312 may be taken into consideration during the execution of map representation 312 for the control of vehicle 307.

Graphic b) shows such a case of a control of a vehicle 307 based on a map representation 312 enriched according to method 100 according to the present invention. For this purpose, map data 311 of an enriched map representation 312 are initially provided by external processing unit 317 to a vehicle 307 to be controlled. During the negotiation of roadway 301 including a corresponding transition area 308, piece of information 313 regarding the preferred route through transition area 308 is taken into consideration for the control of vehicle 307 when an accordingly enriched map representation 312 is called up or executed. In the process, vehicle 307 may be guided along the preferred route through transition area 308, for example taking piece of information 313 into consideration. As an alternative or in addition, piece of information 313 regarding the preferred route may be taken into consideration for behavior prediction of further road users in transition area 308. According to piece of information 313 regarding the preferred route of map representation 312, the control of vehicles 307 thus knows that a certain percentage of the vehicles will drive along the preferred route through transition area 308. This piece of information 313 may be taken into consideration by the control of vehicle 307 for the trajectory planning of a driving trajectory to be driven by vehicle 307.

In the shown example, second route 314 along second further roadway 303 is preferred according to the first and second numbers of first and second driving trajectories 305, 306 of graphic a).

The shown examples of roadways 301, 302, 303 and of the corresponding transition areas 308 are only exemplary. According to the present invention, transition areas 308 may encompass intersection areas of a multitude of roadways, on-ramp areas of expressways or thruways, exit ramp areas of expressways or thruways, traffic circles or other areas customarily occurring in traffic infrastructures in which an intersecting point or a combination or separation of multiple roadways occurs.

Figure 2:
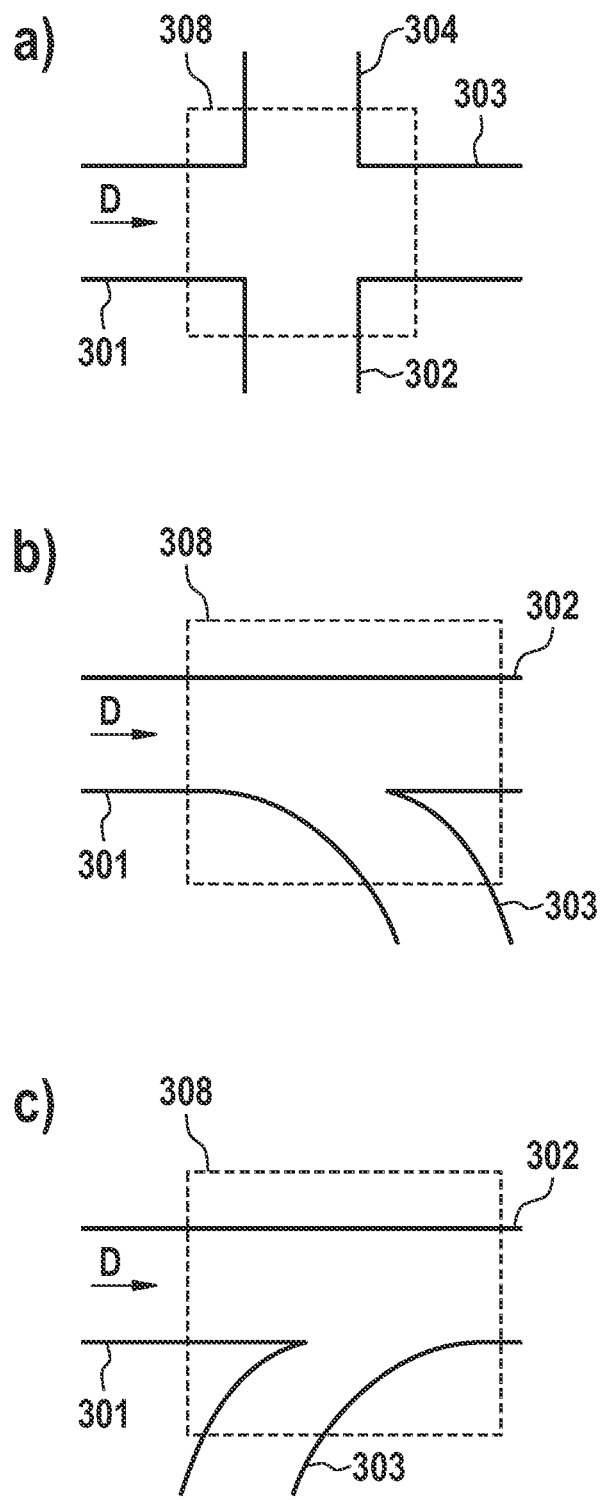
FIG. 2 shows a schematic representation of various roadways including transition areas.

FIG. 2 shows a schematic representation of various roadways 301 including transition areas 308.

Graphic a) shows a previously addressed example of a transition area 308 in the form of an intersection area. In the intersection area, a roadway 301 is combined with three further roadways 302, 303, 304.

Graphic b) shows an example of a transition area 308 in the form of an exit ramp area of an expressway or a thruway. In transition area 308, roadway 301 splits into a first further roadway 302 and a second further roadway 303. In the process, first further roadway 302 describes the continuation of roadway 301, which in the shown example represents the expressway or thruway. Second further roadway 303, in contrast, shows the exit ramp road.

Graphic c) describes a further example of a transition area 308 in the form of an on-ramp area to an expressway or thruway. In transition area 308, a first further roadway 302 and a second further roadway 303 are fused into a roadway 301. In the process, roadway 301 represents the continuation of first further roadway 302, which in each case describe the expressway or thruway, while second further roadway 303 represents the on-ramp road.

The shown embodiments are only exemplary and are not intended to restrict the present invention. Further possible transition areas 308 are covered by the scope of protection of the present invention.

FIG. 3 shows a flowchart of a method 100 for enriching a map representation 312 of a traffic infrastructure.

According to the present invention, map data 311 of a map representation 312 of a traffic infrastructure are received in a first method step 101. Map representation 312 encompasses pieces of information of a plurality of roadways 301, 302, 303 negotiable by vehicles 307. Map representation 312, in particular, encompasses pieces of information regarding at least one roadway 301 including a transition area 308, a split of the at least one roadway 301 into at least one first further roadway 302 and a second further roadway 303 taking place in transition area 308, or a fusion of at least one first further roadway 302 and of second further roadway 303 into the at least one roadway 301 taking place.

In a further method step 103, trajectory data 309 of a multitude of first driving trajectories 305 and of a multitude of second driving trajectories 306 of a multitude of vehicles 307 are received. First driving trajectories 305 extend along a first route 310 encompassing the least one roadway 301 and first further roadway 302. Second driving trajectories 306, in contrast, extend along a second route 314 encompassing the at least one roadway 301 and second further roadway 303.

In a further method step 109, a trajectory comparison for adapting the information of the trajectory data 309 to map representation 312 is carried out.

In a further method step 105, a first number of first driving trajectories 305 along first route 310 and a second number of second driving trajectories 306 along second route 314 are ascertained. Furthermore, a comparison of the first number to the second number is carried out, and possibly a difference between the first and second numbers is determined. In particular, the larger of the two numbers is ascertained by the comparison.

In a further method step 107, first route 310 is marked in map representation 312 as a preferred route if the first number of first driving trajectories 305 along first route 310 is greater than the second number of second driving trajectories 306 along second route 314. In the case of reversed proportions, in which the second number of second driving trajectories 306 is greater than the first number of first driving trajectories 305, second route 314 is, logically, marked as the preferred route.

According to one specific embodiment, a predetermined limiting value for a difference of the first number and the second number may be taken into consideration for the determination of the proportions of the two numbers. In the process, a number of driving trajectories 305, 306 is only greater than a further number of the respective other driving trajectories 305, 306 if the difference between the two numbers is greater than the predetermined limiting value. If the limiting value is not exceeded by the difference of the two numbers, both routes 310, 314 are taken into consideration as being equivalent, and no preferred route is marked.

According to one specific embodiment, piece of information 313 regarding the preferred route stored in map representation 312 encompasses a percentage. The percentage describes the ratio of driving trajectories 305, 306 along the preferred route in relation to the number of driving trajectories 305, 306 along the corresponding not preferred route or in relation to the total number of driving trajectories 305, 306 through transition area 308.

According to one specific embodiment, map representation 312 is designed as a topological map of the traffic infrastructure.

According to one specific embodiment, trajectory data 309 are based on fleet data of a vehicle fleet of a multitude of vehicles 307.

According to one specific embodiment, map representation 312 encompasses a multitude of roadways 301 including corresponding transition areas 308. In the process, method 100 according to the present invention may simultaneously calculate a determination of the preferred routes along the various transition areas 308 of the multitude of roadways 301 for the various roadways 301 and simultaneously generate corresponding pieces of information 313 regarding the preferred routes through the various transition areas 308.

FIG. 4 shows a flow chart of a method 200 for controlling a vehicle 307.

According to the present invention, a map representation 312 enriched according to method 100 according to the present invention for enriching a map representation 312 of a traffic infrastructure is executed in a first method step 201. Executing map representation 312, in the process, encompasses taking into consideration piece of information 313 regarding the preferred route through a transition area 308 of a roadway 301 which is stored in map representation 312.

In a further method step 203, a vehicle 307 to be controlled is activated, taking into consideration piece of information 313 of map representation 312 regarding the route marked as being preferred. In the process, the control of the vehicle, taking piece of information 313 regarding the preferred route into consideration, may encompass the control of the vehicle along the preferred route. As an alternative or in addition, the control of the vehicle, taking piece of information 313 into consideration, may encompass a behavior prediction of further road users, in which piece of information 313 regarding the preferred route through transition area 308 is taken into consideration during the prediction of the future behavior of the further road users. In the process, the activation of vehicle 307 encompasses the output of corresponding control signals by processing unit 315 to actuators of vehicle 307.

FIG. 5 shows a schematic representation of a computer program product 400, encompassing commands which, during the execution of the program by a processing unit, prompt the processing unit to carry out method 100 for enriching a map representation 312 of a traffic infrastructure and/or method 200 for controlling a vehicle 307.

In the shown specific embodiment, computer program product 400 is stored on a memory medium 401. Memory medium 401 may be an arbitrary memory medium from the related art.

What is claimed is:

1. A method for enriching a map representation of a traffic infrastructure, comprising the following steps:
    receiving map data of a map representation of a traffic infrastructure, the map representation including pieces of information of a multitude of roadways negotiable by vehicles, the map representation encompassing pieces of information regarding at least one roadway including a transition area, a split of the at least one roadway into at least one first further roadway and a second further roadway or a fusion of at least the first further roadway and the second further roadway into the at least one roadway taking place in the transition area;
    receiving trajectory data of a multitude of first driving trajectories and a multitude of second driving trajectories of a multitude of vehicles, the first driving trajectories extending along a first route encompassing the at least one roadway and the first further roadway, and the second driving trajectories extending along a second route encompassing the at least one roadway and the second further roadway;
    ascertaining a first number of the first driving trajectories and a second number of the second driving trajectories, and comparing the first number to the second number;
    marking the first route as a preferred route in the map representation when the first number is greater than the second number; and
    predicting, by a processing unit in a first one of the vehicles, a behavior of at least a second one of the vehicles based on the preferred route, wherein the first number is greater than the second number when a difference between the first number and the second number is greater than a predetermined threshold, no marking of the preferred route taking place when the difference is smaller than the predetermined threshold.

2. The method as recited in claim 1, wherein the trajectory data encompass time stamps, the marking of the preferred route being carried out with respect to a time of day and/or with respect to a day of the week.

3. The method as recited in claim 1, further comprising:
    carrying out a trajectory comparison for adapting the pieces of information of the trajectory data to the map representation.

4. The method as recited in claim 1, wherein the transition area formed by: (i) an intersection area of at least two roadways, and/or (ii) an on-ramp area or an exit ramp area of an expressway, and/or (iii) a widening area of a roadway to a roadway having a larger number of traffic lanes, and/or (iv) a narrowing area of a roadway to a roadway having a lower number of traffic lanes.

5. The method as recited in claim 1, wherein the map representation encompasses pieces of information regarding a multitude of roadways including transition areas, the received trajectory data encompassing driving trajectories along the multitude of roadways including transition areas, and preferred routes being simultaneously ascertained for the multitude of roadways including transition areas.

6. The method as recited in claim 1, wherein the trajectory data are based on fleet data of a multitude of trips of a fleet of vehicles.

7. The method as recited in claim 1, wherein the map representation is a topological map of the traffic infrastructure.

8. A method for controlling a vehicle, comprising the following steps:
    executing a map representation of a traffic infrastructure which is enriched by:
        receiving map data of a map representation of a traffic infrastructure, the map representation including pieces of information of a multitude of roadways negotiable by vehicles, the map representation encompassing pieces of information regarding at least one roadway including a transition area, a split of the at least one roadway into at least one first further roadway and a second further roadway or a fusion of at least the first further roadway and the second further roadway into the at least one roadway taking place in the transition area,
        receiving trajectory data of a multitude of first driving trajectories and a multitude of second driving trajectories of a multitude of vehicles, the first driving trajectories extending along a first route encompassing the at least one roadway and the first further roadway, and the second driving trajectories extending along a second route encompassing the at least one roadway and the second further roadway,
        ascertaining a first number of the first driving trajectories and a second number of the second driving trajectories, and comparing the first number to the second number, and
        marking the first route as a preferred route in the map representation when the first number is greater than the second number, wherein the first number is greater than the second number when a difference between the first number and the second number is greater than a predetermined threshold, no marking of the preferred route taking place when the difference is smaller than the predetermined threshold; and
    controlling the vehicle, taking into consideration piece of information of the map representation regarding the route marked as a preferred route.

9. A processing unit, which is configured to enriching a map representation of a traffic infrastructure, the processing unit configured to:

receive map data of a map representation of a traffic infrastructure, the map representation including pieces of information of a multitude of roadways negotiable by vehicles, the map representation encompassing pieces of information regarding at least one roadway including a transition area, a split of the at least one roadway into at least one first further roadway and a second further roadway or a fusion of at least the first further roadway and the second further roadway into the at least one roadway taking place in the transition area;

receive trajectory data of a multitude of first driving trajectories and a multitude of second driving trajectories of a multitude of vehicles, the first driving trajectories extending along a first route encompassing the at least one roadway and the first further roadway, and the second driving trajectories extending along a second route encompassing the at least one roadway and the second further roadway;

ascertain a first number of the first driving trajectories and a second number of the second driving trajectories, and comparing the first number to the second number;

mark the first route as a preferred route in the map representation when the first number is greater than the second number; and predict, by the processing unit in a first one of the vehicles, a behavior of at least a second one of the vehicles based on the preferred route, wherein the first number is greater than the second number when a difference between the first number and the second number is greater than a predetermined threshold, no marking of the preferred route taking place when the difference is smaller than the predetermined threshold.

10. A non-transitory computer-readable medium on which is stored a computer program including commands for enriching a map representation of a traffic infrastructure, the commands, when executed by a computer, causing the computer to perform the following steps:

receiving map data of a map representation of a traffic infrastructure, the map representation including pieces of information of a multitude of roadways negotiable by vehicles, the map representation encompassing pieces of information regarding at least one roadway including a transition area, a split of the at least one roadway into at least one first further roadway and a second further roadway or a fusion of at least the first further roadway and the second further roadway into the at least one roadway taking place in the transition area;

receiving trajectory data of a multitude of first driving trajectories and a multitude of second driving trajectories of a multitude of vehicles, the first driving trajectories extending along a first route encompassing the at least one roadway and the first further roadway, and the second driving trajectories extending along a second route encompassing the at least one roadway and the second further roadway;

ascertaining a first number of the first driving trajectories and a second number of the second driving trajectories, and comparing the first number to the second number;

marking the first route as a preferred route in the map representation when the first number is greater than the second number; and predicting, by the computer in a first one of the vehicles, a behavior of at least a second one of the vehicles based on the preferred route, wherein the first number is greater than the second number when a difference between the first number and the second number is greater than a predetermined threshold, no marking of the preferred route taking place when the difference is smaller than the predetermined threshold.

\* \* \* \* \*